United States Patent [19]
Denker et al.

[11] Patent Number: 6,064,878
[45] Date of Patent: May 16, 2000

[54] METHOD FOR SEPARATELY PERMISSIONED COMMUNICATION

[75] Inventors: John Stewart Denker, Leonardo, N.J.; Christopher J. C. H. Watkins, London, United Kingdom

[73] Assignee: AT&T Corp., New York, N.Y.

[21] Appl. No.: 08/735,849

[22] Filed: Oct. 23, 1996

[51] Int. Cl.[7] .................................................. H04Q 7/32
[52] U.S. Cl. ........................ 455/415; 455/414; 455/417
[58] Field of Search ................. 455/565, 181.1, 455/414, 415, 417, 433, 461, 563; 379/241, 242, 243, 244, 67

[56] References Cited

U.S. PATENT DOCUMENTS

| | | | |
|---|---|---|---|
| 5,224,150 | 6/1993 | Neustein | 379/57 |
| 5,329,578 | 7/1994 | Brennan et al. | 379/67 |
| 5,444,760 | 8/1995 | Russ | 379/45 |
| 5,835,570 | 11/1998 | Wattenbarger | 379/67 |

FOREIGN PATENT DOCUMENTS

| | | | |
|---|---|---|---|
| 2 720 578 | 12/1995 | France | H04M 3/58 |
| WO93/07566 | 4/1993 | WIPO | G06F 13/372 |
| WO93/16546 | 8/1993 | WIPO | H04M 3/42 |

*Primary Examiner*—Gail O. Hayes
*Assistant Examiner*—Ho S. Song

[57] ABSTRACT

A call contact platform (CCP) is provisioned with handles that belong to call recipients. Each recipient can have any number of handles in the CCP and each handle is associated with conditions under which a call employing the handle may be established. Specifically, when a party supplies a handle to a telecommunication network (previously given to the party by the call recipient), the network contacts the CCP and interacts with it as required in conformance with stored instructions. If appropriate, the CCP instructs the telecommunication network to establish a connection. A recipient can also give a party a handle that includes a message, where the handle is not prestored in the CCP. After the network contacts the CCP, the party provides the message, the CCP extracts instructions from the message, or retrieves instructions with the help of the message, and, as before, causes the telecommunication network to establish a connection, if appropriate. A party can also obtain a handle for a call recipient pursuant to predefined interactions with the telecommunication network that provide information specified by the call recipient.

22 Claims, 3 Drawing Sheets

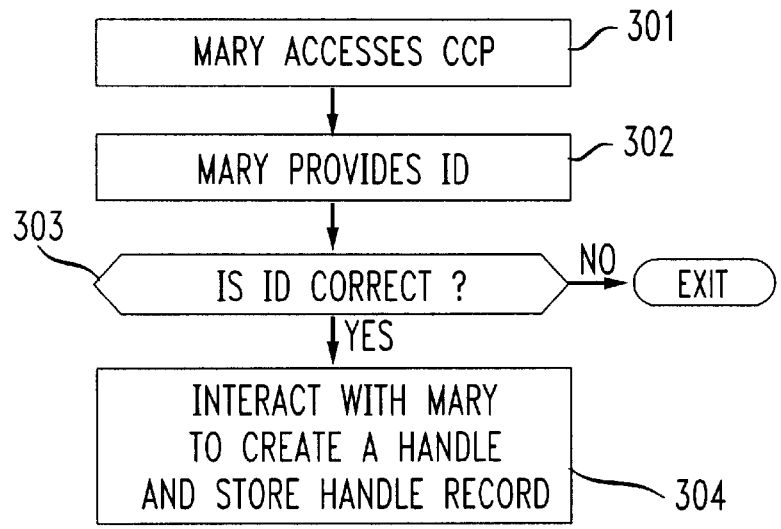
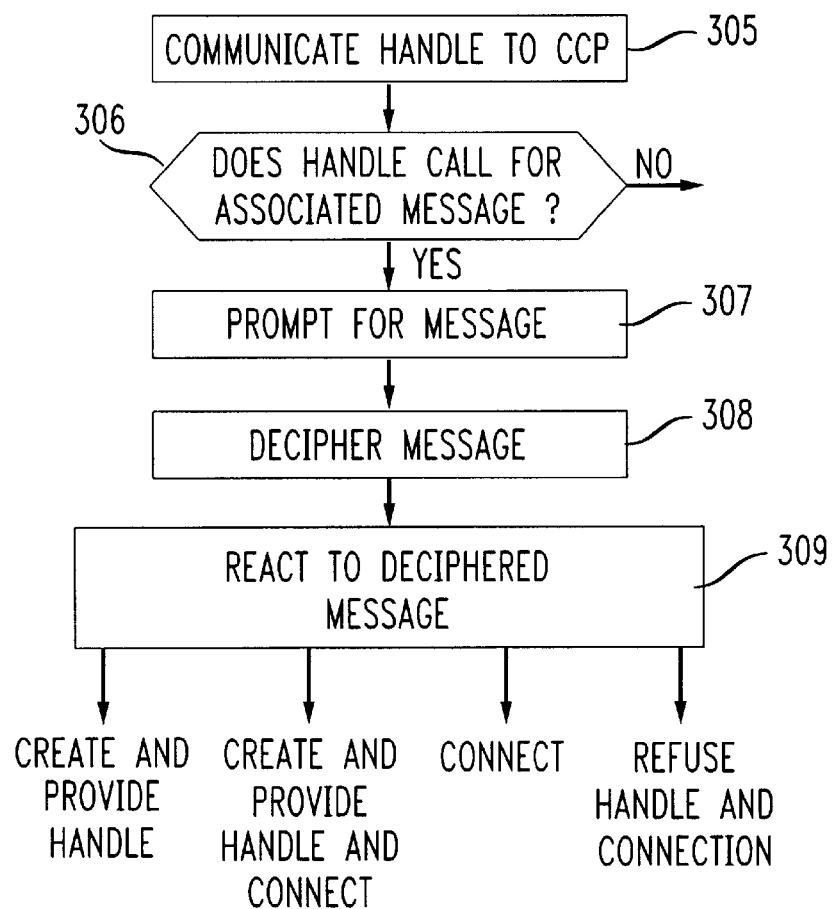

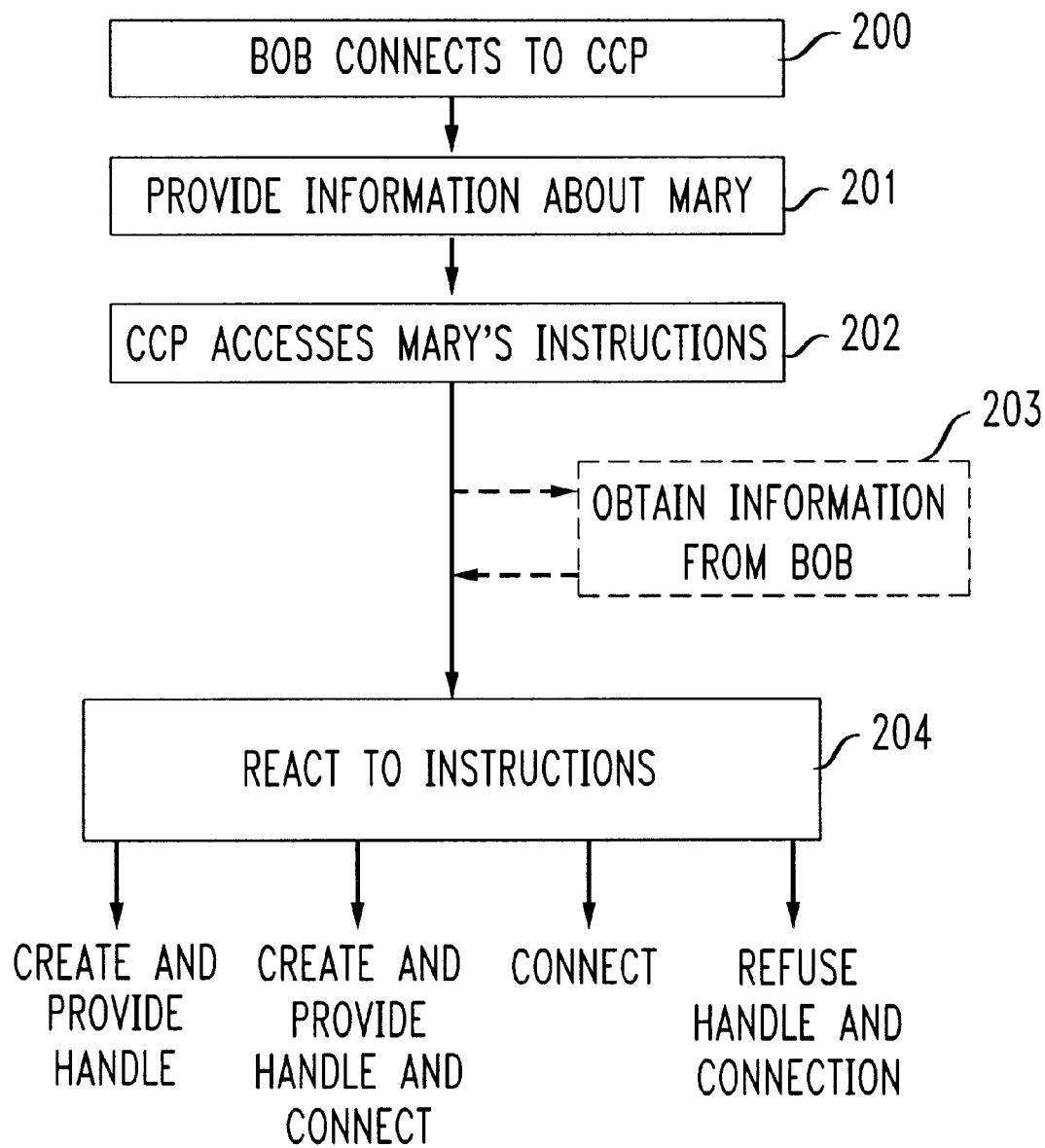

METHOD FOR SEPARATELY PERMISSIONED COMMUNICATION

BACKGROUND OF THE INVENTION

This invention relates to telecommunications and, more particularly, to methods for establishing a communication path between parties.

The classic technique for establishing a communication path between two parties involves a caller, say Bob, obtaining the phone number of a called party, say Mary. Bob dials Mary's number and the network establishes a connection. In this classical methodology there is a known, fixed, relationship between Mary and her phone number. The only way for Mary to maintain anonymity or to be selective as to whom she would accept as a caller is to keep her phone number secret from most people. But even that is not as effective as may be desired because callers can just happen to select Mary's number and, also, once the phone number is given the information cannot be retrieved.

In connection with accepting of calls, Mary can subscribe to a "Caller ID" feature where, during the ringing interval, Mary is shown the phone number of the caller. That allows Mary to choose whether to answer the call or not. However, the "Caller-ID" feature fails to preserve Mary's tranquillity because all incoming calls still ring at Mary's phone.

Another form of selectivity is attained when Mary has more than one telephone number and gives out different numbers to different people. This, alas, has the disadvantage of requiring Mary to have—and pay for—a number of different telephone numbers, and each telephone number corresponds to a different end point in the telephone network. Even in the more sophisticated arrangements where the phone number is not fixedly associated with a network end point, and the number of end points may, therefore, be less than the number of phone numbers that Mary calls her own (e.g., the recipient, Mary, has a conventional number and an 800 number that translates to the same conventional number), there is still a charge that is levied on Mary for each number. Moreover, the relationship between the known numbers and the identity of the user is effectively fixed, since it is impractical to dynamically establish and/or revoke existing telephone numbers. If Mary tells somebody her private number, she cannot revoke that number a week later without interacting with the service supplier to obtain a new number. Additionally, she needs to divulge her new number to those who she wants to know the new number. Because of the cost, the number of different phone numbers that Mary might maintain is typically quite small.

What is desired is an arrangement where a recipient can have a more flexible interface to the world: an interface where different callers may have different permissions for accessing Mary and where, at will, Mary can generate or revoke calling permissions.

In the field of electronic mail, there exist remailers that facilitate communication while providing various types of enhanced privacy. In one mode, a sender, say Joe, having established an account with the remailer, sends a message to the remailer. This includes instructions on how the body of the message is to be delivered. The remailer removes from the incoming message the usual fields that identify the sender, substitutes a pseudonym, and forwards the body to the requested destination(s). The intended application of such services includes, for example, people who wish to "blow the whistle" on misconduct by their employer, government, etc. The reverse service also exists, whereby Joe can establish an alias at a remailer, so that mail addressed to that alias will be forwarded to Joe. This allows him to receive messages on controversial subjects (see, for example: http://www.well.com/user/abacard/remail.html).

For that matter, in the field of conventional postal service, letter drops, parcel drops, and remailers have existed for years. Among other things, such services allow people to communicate without, for instance, divulging their home addresses.

Remailer service is obviously attractive to criminals, and service operators typically take steps to discourage this.

SUMMARY OF THE INVENTION

The arrangement and process disclosed herein enables a call recipient, e.g., Mary, to have separately permissioned communication with different callers, e.g. Tom. This capability is achieved by means of a Call Contact Platform (CCP) that is provisioned by Mary, or pursuant to her directions. Specifically, the CCP is provisioned with handles that belong to Mary, and each handle specifies conditions under which a call employing the handle may be established, with Mary being the called party. In the context of this disclosure, a "handle" is any information that is used by a caller to reach a certain recipient. This can be as simple as a conventional telephone number, a spoken utterance (e.g., "call Mom"), an encrypted message, etc.

In one disclosed embodiment, Mary provisions the call contact platform with instructions on how to react to a selected handle and provides this handle to Tom. When Tom wishes to call Mary, he supplies the handle to the telecommunication network, the network contacts the CCP and interacts with it as required in conformance with the instructions left by Mary. If appropriate, the CCP instructs the telecommunication network to connect Tom to Mary. In another disclosed embodiment, Mary provides Tom with a handle that includes a message (probably encrypted). After the network contacts the CCP, Tom provides the message to the platform, the platform extracts instructions from the message or retrieves instructions with the help of the message and, as with the previous embodiment, causes the telecommunication network to connect Tom to Mary, if appropriate. In still another embodiment, Tom has no handle, so he contacts the CCP directly. After a predefined interaction, Tom obtains a handle for Mary and/or is connected to her. Thereafter, Tom can use the handle to contact Mary pursuant to the provisioning for that handle.

At any time, either by a predetermined algorithm or at Mary's pleasure, the handle previously provided to Tom can be terminated, or the instructions relating to that handle modified.

This arrangement can be employed in Internet telephone and data communication as well as in the traditional voice telephony network.

BRIEF DESCRIPTION OF THE DRAWING

FIG. 2 presents a flow diagram for Mary to access database 120 in FIG. 1;

FIG. 3 is one flow diagram for a caller's interaction with the CCP; and

FIG. 4 is another flow diagram of a caller's interaction with the CCP.

DETAILED DESCRIPTION

Figure 1:
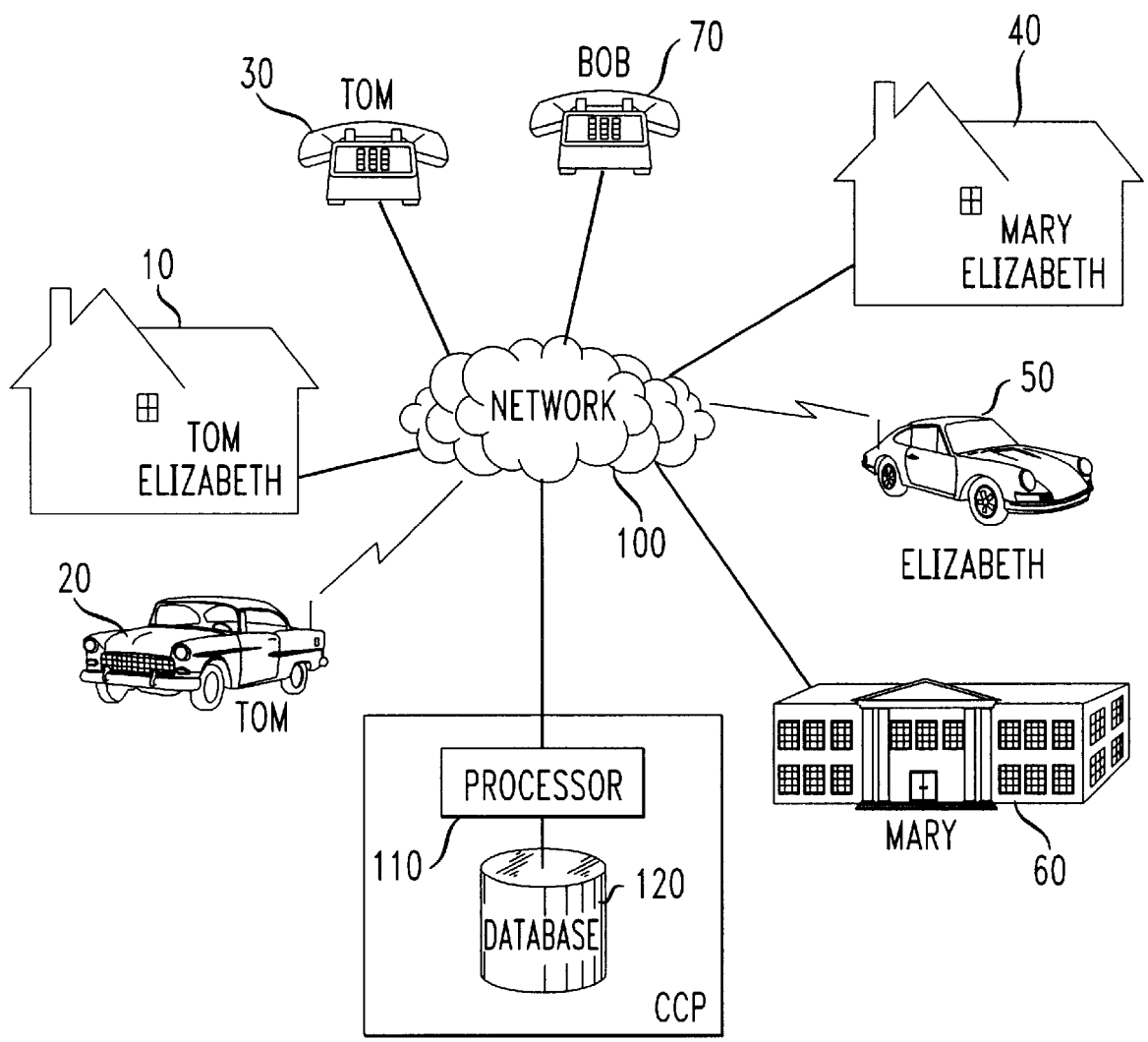
FIG. 1 presents a diagram of a telecommunications network which includes hardware for implementing the principles disclosed herein.

Through a very simplified example where Tom and Bob are callers and Mary and Elizabeth are call recipients, FIG.

1 illustrates various call set-up scenarios using today's telecommunication network 100, plus enhancements according to the principles of this invention. Tom can be a caller from a phone in home 10, his car 20, or from a phone 30 in his work location. Elizabeth may be a call recipient at her home 10, Mary's home 40, or her car 50. Mary may be a call recipient at her home 40 or at work 60. Additionally, while Mary's phone at office 60 may have a conventional (POTS) telephone number by which she can be reached, she may also have an 800 number that is translated to that POTS number. Moreover, the translation to the POTS number at office 60 may be effective only during working hours, and a different translation effected at other times (e.g. to a person at a different time zone, or to Mary at her home 40, etc.). It is assumed that Tom has at least one handle by which he can call Mary, and another handle by which he can call Elizabeth. The permissions associated with each such handle are in Mary's and Elizabeth's purview, respectively.

It is also possible that another caller, e.g. Bob at telephone 70, may wish to call Mary, but Bob has no handle for Mary and might even not know Mary. Bob may know Tom, however, and obtain a handle for Mary from Tom. It is also possible that Bob was given a handle by Mary, but that handle includes an associated message that controls the usability of the handle.

The following discloses an arrangement where Mary can be reached wherever she is, and under whatever conditions she specifies. She achieves this dominion over connections to her through control of the handles that she gives out to callers and the conditions that she sets up for those handles. She may specify those conditions dynamically.

Achieving the above involves two processes:

A process that allows Mary to inform the CCP of her wishes with respect to each of the handles that she establishes (and perhaps the corollary process for providing Bob with a handle for reaching Mary), and A process by which Bob can be connected to Mary in conformance with her wishes.

Connecting to Mary

When Bob provides a handle to the telecommunication network, the process of connecting Bob to Mary is much like connections to any 800 type number. That is, Bob provides the handle to the network, the network communicates the handle to a processor with an attendant database, and based on information provided by the database via that processor, the call is routed to a destination. In the instant case, the processor is the CCP which translates the handles into whatever phone number is either a) preassigned by the network (e.g. when Mary has a single number), b) specified by Mary (e.g., when she either has more than one number or dynamically informs the network of her whereabouts), or c) dynamically specified by the network (e.g. when the network searches for Mary and determines that she make be reached through the cellular network).

When Bob does not have a handle, the process of connecting Bob to Mary comprises a subprocess whereby Bob is qualified by the CCP and perhaps receives a handle, and a subprocess where Bob is connected to Mary. Since Bob is connected to the CCP for qualification, the subprocess of making a connection to Mary is basically a call transfer process, which is conventional.

Since the process of connecting to Mary is basically conventional, the following concentrates on explaining the features and capabilities of the arrangement and method disclosed herein and on the process of provisioning the CCP with handles for Tom, Bob, etc.

Provisioning the CCP

The call contact platform (CCP) is at the heart of the interactions involving handles. In FIG. 1, the CCP comprises a processor 110 coupled to database 120 which contains records of handles for each recipient. For Mary, for example, database 120 may contain records for the handles given out to Tom, handles given out to Elizabeth, a handle given out to Bob, perhaps, etc. Each of those records has an associated set of instructions which dictate how, and under what circumstances, the handle that corresponds to the record may be translated to a network end point where Mary can be reached.

As a service to Mary, the records may be inserted into database 120 by the telecommunications provider but, more likely, it will be found preferable for the records to be generated personally by Mary or pursuant to Mary's directions, without intervention from the telecommunications provider. Records created by Mary are inserted into database 120. Records created by others, such as Bob, are used but are not necessarily inserted into database 120.

A Record Created by Mary

The process for Mary creating records may be quite conventional. It can be a voice-based process where processor 110 comprises a conventional voice interactive system, or a data-based process where processor 110 comprises, for example, an Internet site. In the latter case, hypertext transfer protocol (HTTP) may be used and the necessary data may be presented and formatted in HTML (HyperText Markup Language) forms. A flow chart that depicts this process is presented in FIG. 2. Electronic mail offers yet another way of communicating with processor 110.

When Mary accesses processor 110 by executing step 301 in FIG. 2 (e.g. by dialing a predetermined number) she is guided through a menu which first demands that Mary identify herself (step 302) to the processor (e.g. with an authorization code). When processor 110 is satisfied of Mary's authenticity (step 303), it continues with subsequent steps in the menu and provides Mary with access to database 120. In those subsequent steps, (step 304) Mary can create a new handle to be inserted in database. By editing the handles, Mary controls the conditions that the CCP imposes before the handle is translated to a valid destination. By way of example, this may include:

the people who are permitted to use the handle,
the level of authentication that Mary desires callers to provide,
the groups whose members can use the handle,
the times when the handle may be used,
the number of times the handle may be used,
the duration of calls (per call, and/or cumulative) that this handle is valid,
the longevity of the handle,
the permitted modes of communication (e.g., voice, messaging only, e-mail only),
the handle's status (active or inactive), etc.

Bob Has A Handle and A Message

One of the possible scenarios that may be used to an advantage with the disclosed arrangement is when Mary meets Bob at some function and gives Bob a handle with an associated message. This is illustrated in FIG. 3. The message may simply be a code (embedded in the handle or separate from the handle), or it may be a separate and distinct set of instructions to the CCP (probably encrypted). When Bob wishes to call Mary, he employs the given handle (step 305) and the network communicates the handle to processor 110. When prompted, (step 307) Bob divulges the message and processor 110 reacts accordingly. As indicated above, the message may be simply a code. In such a circumstance, processor 110 consults a table of codes that Mary has previously installed in database 120, and responds (step 309) in accordance with instructions associated with that code. Those instructions may simply cause processor 110 to instruct network 100 to connect Bob to Mary and cancel the handle (a one-time-use handle). Alternately, those instructions may cause processor 110 to provide Bob with a permanent handle and to cancel the handle Bob first used. The permanent handle may be a pre-existing handle of some specified limited use that is given to unspecified people, it may be a pre-existing handle for specified people, or it may be a completely new handle. Of course, in the case of a handle for specified people, database 120 would need to augment the record for that handle (to add Bob to the list). Also, in the case of a brand new handle, database 120 would need to create and store a new record.

Bob Has No Handle

This transaction, depicted in FIG. 4, allows Bob to communicate with Mary even when he has no handle. This is accomplished by Bob calling the CCP and requesting a handle for Mary. He either receives a handle and is also connected, receives a handle but is not connected, is connected but receives no handle, or is refused both.

Describing this in more detail, Bob is coupled to the processor 110 in block 200 and the processor outputs a prompt, offering Bob to specify the recipient for whom he wants a handle. In response (block 201), Bob gives Mary's name and address, or some other designation by which the CCP knows Mary. (For example, Mary may be the president of the her town's Garden Club.) Processor 110 accesses database 120, identifies Mary and obtains information about Mary's wishes regarding strangers who wish to be obtain a handle for reaching her. At this point, the situation is akin to a person contacting the Information Operator and asking for the telephone number of an individual. The response can be just as it is today; that is, give Bob a handle by which Bob can call Mary (e.g. a telephone number), or refuse to give a handle ("unlisted number"). Additionally, in accordance with the principles disclosed herein, the CCP can also provide a number of intermediate responses.

One response, for example, is for the CCP (in accordance with Mary's directions) to provide Bob with a handle without inquiring into Bob's identity (block 204) or just taking note of where Bob is calling from (using Automatic Number Identification, ANI), but that handle has a prescribed limited use. For instance, it may allow Bob to call Mary, but only once, and at a time convenient for Mary.

Another response (block 203) is for the CCP to initiate a Contact-Request Interaction (CRI), which requires Bob to provide information that would induce the CCP (pursuant to Mary's instructions) to provide Bob with a handle (or merely direct that Bob be connected to Mary). If Mary wishes to maintain anonymity, the CRI step need not include any information that Bob could use to determine Mary's identity. This situation may occur, for example, when a person wishes to call the president of a company. While the president of the company may be willing to accept a call, she may wish to not have her identity be known.

In any event, once Bob provides the requested information, Mary's instructions are again consulted and an appropriate action is taken. This (as mentioned above) includes, for example:

a new handle is created for Bob, or

Bob is given an existing handle that accommodates Bob as a caller, or

Bob is refused a handle but a connection is nevertheless established, or

Bob is completely turned away, etc.

The above suggests that Mary is not necessarily expecting Bob to call her. There of course can be a situation where Mary actually desires to be called, but for a variety of reasons Mary wishes to nevertheless control who calls, and under what circumstances. In a computer communication environment, a convenient implementation for such a situation may be for Mary to publish an HTML form on the Internet. The form can contain a text entry field into which Bob can write a brief message as to who he is or why he wants a handle. When Bob submits the form, the form's URL causes Bob's data to reach processor 110. The decision whether to grant a handle is made in block 202. The decision may be as discriminating as Mary wishes it to be. At one extreme, for example, Mary may choose to grant a unique handle to any person, or to any person who provides his or her name. On the other extreme, Mary may request that the party wishing to get a handle submit information and a password that was given to that party by someone who is known to and trusted by Mary, or be vouched for in a formal way by a third, trusted, party. Once a decision is made to grant a handle, block 204 causes processor 110, in cooperation with database 120 to generate a handle (if a new one is needed) or select an existing one. The information provided by Bob is recorded in database 120 together with the handle assigned to Bob and, finally, the handle is provided to Bob. Optionally, according to block 204, the CCP directs network 100 to connected Bob to Mary. Of course, when the decision is made in block 103 that a handle should not be given out, then block 106 may be included to so inform Bob.

It may be noted that while the above describes the "publishing" of Mary's form by the CCP, it need not be. That is, Mary might publish such a form herself, for example, on her own Internet site, and handle the transaction of granting or refusing a handle without interaction with the CCP. Of course, after she grants a handle she may need to access the CCP and modify data 120 as described above. It may also be noted that when the CCP is coupled to Bob via the Internet and provides Bob with a handle, then the CCP can also obtain from Bob his own voice telephone number and, if appropriate, engage the voice telecommunication network and have it establish voice communication between Bob and Mary. Obviously, it can also establish a conventional Internet path between Bob and Mary and that path can be used for data, voice, video, etc.

Changing A Handle

It is possible that the process whereby Tom identifies himself to the system is strongly resistant to compromise (whereby handles might become known to an untrusted third party, say Roger), but it is also possible that for convenience a less-strong method may sometimes be used, and even the best methods sometimes fail. Since presumably Tom values Mary's trust, when Tom believes that his handle for Mary has become compromised, he may wish to revoke it and obtain a new one. He could, of course, obtain a new handle ab initio, directly from Mary, or by whatever means the first one was obtained. However, preferably this revocation and reissuance process should not place a burden on Mary, the idea being that Tom is responsible for the integrity of handles issued to him. The system may require Tom to provide stronger-than-routine identification during the revocation and reissuance process, to keep Roger from subverting that, too. It is also possible that in cases of suspected compromise, a handle may be partially revoked, disabling certain permissions (e.g., telephony) while retaining others (e.g., electronic mail).

Contact-Status

In this transaction the CCP enables Bob to obtain information about the status of his handle for a particular subscriber. In computer communication, this facility may be implemented by providing a contact status URL. When Bob invokes this URL and provides Mary's handle, the CCP returns an HTML document, constructed from a query to the contact database using Mary's handle, and the HTML document contains a summary of the current permission of the handle. This capability allows Bob to know the conditions under which the network will complete his call attempts to Mary and avoids wasting his time and the network's resources.

Permission-Review

The CCP provides a facility for Mary to submit her identity to processor 110 and thereby be allowed to review the current status of handles she has issued. She can then adjust the permission level for each handle separately, or group of handles. A convenient browsing and updating arrangement is for Mary to send an HTTP request, and for her handles and permission data to be returned as an HTML document that displays the current handles with their permissions. These forms enable Mary to send back instructions to alter the permissions or to revoke certain handles. This is a straightforward database viewing and updating application that can employ conventional Internet communication tools.

Third Party Identity Verification

In the prevention of harassment, the contact-request interaction presents a security weakness. A harassing caller who has had his handle revoked by an irate Mary may simply request another handle using one of Mary's public contact-request initiators. As suggested above, a solution for this is to provide an option to insert an identity verification step into block 203 of FIG. 4 to verify that Bob is trustworthy. This may be achieved by subjecting the caller—e.g., Bob—to a third-party certification of Bob's identity. Computer 110 sends a challenge string C and its public key KPu1 to Bob, who communicates C and KPu1 to a trusted third party together with whatever other information the trusted third party requires. The trusted third party makes its determination, D (containing the identity of Bob and perhaps some other information), combines it with C to form string DC, encrypts DC with KPu1 to create string DC' and forwards DC' to processor 110. Processor 110 decrypts DC' with KPr1, confirms that the received string is responsive to challenge string C, evaluates D, and proceeds appropriately.

In the simplest embodiment of the principles disclosed herein, May have different handles for different potential callers, and a caller would have one handle for Mary. More generally, a caller may wish to communicate with Mary using any of a range of communication methods such as conventional telephony, electronic mail, an interactive text chat protocol, or a packet telephony protocol, and for each communication method the caller may be given different handles for Mary. Put another way, the arrangement disclosed herein allows Mary to keep all points of access to her under strict control; not just access to her voice phone. Therefore this solves the problem of junk e-mail and junk faxes as well as junk phone calls. As an aside, a caller may also have different handles for Mary based on different network end points where Mary can be reached (OK to be called at the office, but not OK to be called at home).

The control afforded to Mary can also be employed to achieve selected one-way communication. For example, a pollster can publish a handle for the purpose of callers voting on a particular question. Callers call in and are thus counted. Callers can also be requested to leave specified information for a finer determination of the question at hand.

It should also be noted that the arrangement disclosed herein offers an alternate caller ID feature. Since Mary can demand to know (and verify) the identity of a caller before the caller is granted a handle, that data can be included in the CCP. When the CCP is consulted by the network when Tom attempts to call Mary by providing the handle he has for Mary, it is quite straight forward for the CCP to include Tom's identity in the information provided to the telecommunication network. The network can then provide Tom's identity to Mary during ringing or immediately when she picks up the communication. This alternate caller ID feature complements and improves over the conventional caller ID feature which merely identifies the telephone line that is used to make the call. The latter provides only circumstantial information about who the caller is: the same person may call from different lines, and different people may call from the same line. Moreover, caller-ID is sometimes unavailable, and it can also be withheld by the caller. A handle, on the other hand, must always be supplied for the caller to be able to get through, and it is specific to the person calling if Mary so wishes it, not the line.

The disclosure above addressed the notion of computer communication such as e-mail, illustratively using the Internet, as well as the notion of voice telephony. It should be understood, however, that other approaches are also possible, such as a combination of the data and voice. Aside from the notion of voice telephony that actually traverses the Internet and appears to the communication channel as digital data, there are also the currently prevailing user arrangements where a "plain old telephone" is situated at a desk alongside a computer that is connected to, for example, the Internet. As indicated above, the principles disclosed herein are easily applicable to this arrangement.

We claim:

1. A method for connecting calls to a recipient's telephone having a single called-party number to which said network directs calls destined to said recipient's telephone, said method comprising the steps of:

a call contact platform accepting an access from a special party;

based on information provided by said special party and previously provided by said recipient and stored in a database, developing a new, revocable, unique handle, which a caller is able use without post dial tone prompting for connection to said recipient's telephone, and which said network, as with all other handles relating to said recipient's telephone, is adapted to translate to said single called-party number and connect said caller to said recipient's telephone under conditions specified by said special party by means of said information;

developing said conditions under which said handle, when supplied by a caller, is translated to said caller-party number; and carrying out an action following said step of developing conditions;

where said step of developing a new handle is substantially independent of the number of previously developed handles that coexist with said handle.

2. The method of claim 1 where said access by said special party comprises digital communication.

3. The method of claim 1 where said special party is the recipient.

4. The method of claim 1 where said special party is the caller.

5. The method of claim 1 where said special party is the caller and the action comprises a step of providing the developed handle to the caller.

6. The method of claim 5 where said action includes said telecommunication network connecting the caller to the recipient.

7. The method of claim 6 where said access from said special party carries either analog signals or digital signals but a connection established between the caller and the recipient by said action is analog.

8. The method of claim 6 where said access from said special party carries either analog signals or digital signals but a connection established between the caller and the recipient by said action is digital.

9. The method of claim 5 wherein said action comprises modifying the database to permit the caller to be connected to the recipient when the caller provides the handle to said telecommunication network.

10. The method of claim 1 where said special party is the caller and the action causes the caller to be connected to the recipient.

11. The method of claim 5 where at least some information relating to said conditions is embedded in said handle that is provided to said caller.

12. The method of claim 11 where said at least some information that is embedded in said handle is encrypted.

13. The method of claim 4 where the action step comprises a decision as to whether to connect the caller to the recipient.

14. The method of claim 1 where information developed in said step of developing conditions are stored in said database.

15. The method of claim 1 where the conditions are selected from a set comprising date, and longevity of the handle.

16. The method of claim 1 where the conditions of different handles by which callers can be connected to a recipient are different.

17. The method of claim 15 where said set further comprises mode of communication.

18. The method of claim 17 where said set further comprises a requirement to confirm identity of the caller via a trusted third party information from the caller.

19. The method of claim 17 where said set further comprises identity of the caller and membership in a specified group.

20. The method of claim 17 where said set further comprises status of the caller.

21. The method of claim 17 where said set further comprises call duration.

22. The method of claim 17 where said set further comprises a requirement to obtain information from the caller.

* * * * *

UNITED STATES PATENT AND TRADEMARK OFFICE
CERTIFICATE OF CORRECTION

Page 1 of 1

PATENT NO. : 6,064,878
DATED : May 16, 2000
INVENTOR(S) : John Stewart Denker and Christopher J. C. H. Watkins It is certified that error appears in the above-identified patent and that said Letters Patent is hereby corrected as shown below:

Column 8,
Line 43, between "able" and "use" insert --to--.
Line 52, change "caller" (last word) to --called--.

Column 10,
Line 11, before "mode" add --the--.

Signed and Sealed this

Tenth Day of July, 2001

*Attest:*

NICHOLAS P. GODICI
*Attesting Officer*    *Acting Director of the United States Patent and Trademark Office*